(12) United States Patent
Lifshitz et al.

(10) Patent No.: US 11,218,559 B2
(45) Date of Patent: Jan. 4, 2022

(54) ASYMMETRIC NETWORKING PROXY

(71) Applicant: RED HAT, INC., Raleigh, NC (US)

(72) Inventors: Yuval Lifshitz, Kfar HaOranim (IL); Sebastian Scheinkman, Petah Tikva (IL)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 16/423,794

(22) Filed: May 28, 2019

(65) Prior Publication Data

US 2020/0382615 A1 Dec. 3, 2020

(51) Int. Cl.
| | |
|---|---|
| *H04L 29/08* | (2006.01) |
| *H04L 29/06* | (2006.01) |
| *G06F 9/455* | (2018.01) |
| *H04L 12/66* | (2006.01) |
| *H04L 29/12* | (2006.01) |

(52) U.S. Cl.
CPC .......... *H04L 67/28* (2013.01); *G06F 9/45558* (2013.01); *H04L 12/66* (2013.01); *H04L 61/10* (2013.01); *H04L 69/08* (2013.01); *H04L 69/321* (2013.01); *G06F 2009/45595* (2013.01)

(58) Field of Classification Search
CPC ......... H04L 67/28; H04L 61/10; H04L 12/66; H04L 69/08; H04L 69/321; G06F 9/45558; G06F 2009/45595
See application file for complete search history.

(56) References Cited

U.S. PATENT DOCUMENTS

| | | | | |
|---|---|---|---|---|
| 5,452,292 | A * | 9/1995 | Okanoue | H04L 12/66 370/403 |
| 5,909,446 | A * | 6/1999 | Horikawa | H04L 61/10 370/469 |
| 6,023,563 | A * | 2/2000 | Shani | H04L 12/4625 370/401 |
| 6,721,353 | B1 * | 4/2004 | Taubert | H04L 29/06 370/466 |
| 6,873,620 | B1 * | 3/2005 | Coveley | H04L 12/66 370/395.31 |
| 9,419,921 | B1 * | 8/2016 | Anderson | H04L 49/70 |

(Continued)

OTHER PUBLICATIONS

Fatturrahman, F. "SDN Controller Robustness and Distribution Framework", Master of Science Thesis—Deft University of Technology. 69 pages.

(Continued)

*Primary Examiner* — Ramy M Osman
(74) *Attorney, Agent, or Firm* — Lowenstein Sandler LLP

(57) ABSTRACT

An asymmetric proxy receives a request from a source network, where the source network sends the request at a first networking layer, and determines a destination network associated with the request, where the destination network communicates at a second networking layer, and where the second networking layer is different than the first networking layer. The asymmetric proxy removes information associated with the source network from one or more networking layers of the request, stores the information associated with the source network in a memory space, translates the one or more networking layers of the request to include information associated with the destination network, and provides the request to the destination network at the second networking layer.

28 Claims, 8 Drawing Sheets

(56) References Cited

U.S. PATENT DOCUMENTS

| | | | |
|---|---|---|---|
| 9,979,677 B2 | 5/2018 | Zhang et al. | |
| 2002/0141384 A1* | 10/2002 | Liu | H04L 65/1026 |
| | | | 370/352 |
| 2007/0050843 A1* | 3/2007 | Manville | H04L 65/104 |
| | | | 726/12 |
| 2010/0192216 A1* | 7/2010 | Komatsu | H04L 63/0209 |
| | | | 726/12 |
| 2010/0217847 A1* | 8/2010 | Cook | H04L 61/6022 |
| | | | 709/222 |
| 2013/0031615 A1* | 1/2013 | Woodward | H04L 67/02 |
| | | | 726/4 |
| 2013/0117442 A1* | 5/2013 | Mountain | H04N 21/44231 |
| | | | 709/224 |
| 2015/0281171 A1* | 10/2015 | Xiao | H04L 67/14 |
| | | | 709/225 |
| 2015/0381484 A1* | 12/2015 | Hira | H04L 69/22 |
| | | | 370/390 |
| 2016/0143076 A1* | 5/2016 | Razavi | H04L 67/101 |
| | | | 370/329 |
| 2016/0344664 A1* | 11/2016 | Pahuja | H04L 12/66 |
| 2016/0371508 A1* | 12/2016 | McCorkendale | G06F 21/6254 |
| 2017/0019369 A1* | 1/2017 | Ravinoothala | H04L 47/125 |
| 2017/0019370 A1* | 1/2017 | Ravinoothala | H04L 61/103 |
| 2018/0062994 A1* | 3/2018 | Webb | H04L 45/745 |
| 2019/0306267 A1* | 10/2019 | Lee | H04L 67/2823 |
| 2020/0076733 A1* | 3/2020 | Venkataraman | H04L 45/74 |

OTHER PUBLICATIONS

Apigee Docs, (Jan. 28, 2019). "503 Service Unavailable". 8 pages.

* cited by examiner

ASYMMETRIC NETWORKING PROXY

TECHNICAL FIELD

The present disclosure is generally related to computer systems, and more particularly, to an asymmetric networking proxy for computer systems.

BACKGROUND

Platform-as-a-Service (PaaS) system offerings can include software and/or hardware facilities for facilitating the execution of web applications in a cloud computing environment (the "cloud"). Cloud computing is a computing paradigm in which a user engages a "cloud provider" to execute a program on computer hardware owned and/or controlled by the cloud provider. A cloud provider can make containers and/or virtual machines (VMs) hosted on its computer hardware available to customers for this purpose. The cloud provider can provide an interface that a user can use to requisition virtual machines and associated resources such as security policies, processors, storage, and network services, etc., as well as an interface to install and execute the user's applications and files on the virtual machines.

PaaS offerings can facilitate deployment of web applications without the cost and complexity of buying and managing the underlying hardware and software and provisioning hosting capabilities, providing the facilities to support the complete life cycle of building and delivering web applications and services entirely available from the Internet.

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Figure 1:
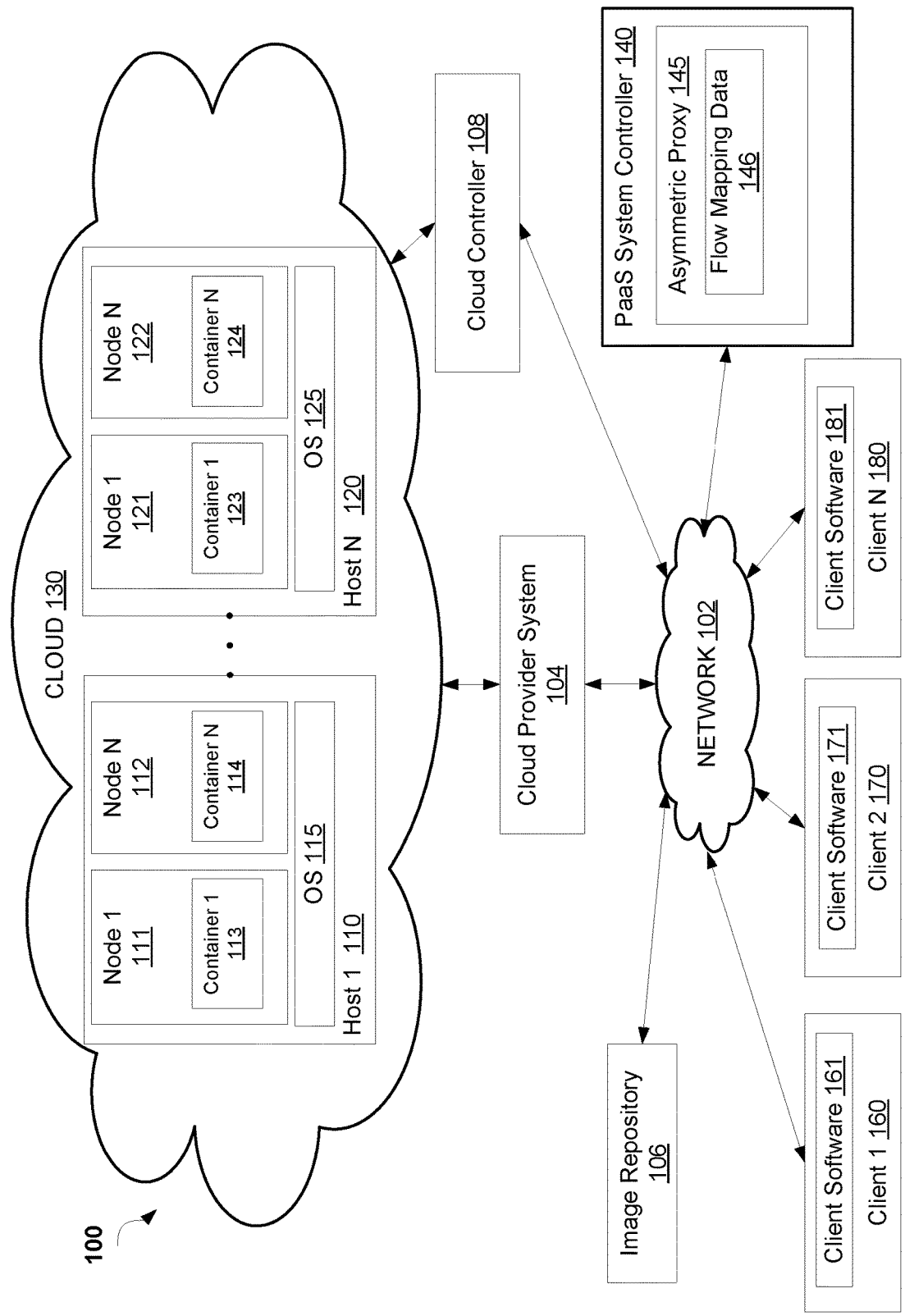
FIG. 1 depicts a high-level component diagram of an example computer system architecture, in accordance with one or more aspects of the present disclosure.

Described herein are methods and systems for implementing an asymmetric proxy to facilitate userspace networking within a cloud computing environment. Cloud computing environments provide many advantages over locally owned computing systems such as optimization of shared resources, reduction of costs, and improved client scalability. In many cloud based implementations, cloud providers and application owners can make use of userspace networking to improve the performance of networking functions available in such cloud based systems. Userspace networking refers to an implementation where networking functionality that is typically performed at the operating system level is relocated into the application level (e.g., userspace). In such instances, the networking functionality can be optimized to suit a particular system implementation to improve performance, prevent networking packets from being copied multiple times between the operating system level and application level, utilize multi-core architectures when handling high volume networking traffic, simplify development of advanced network traffic functions, and streamline networking functionality in virtualized environments where a second operating system is running as a process in userspace.

Userspace networking, however, can expose systems to problems with monitoring, security, and performance since the networking traffic processed in userspace can be opaque to the operating system that may need visibility into that traffic to perform those functions. These issues can be particularly problematic in cloud computing environments that include virtual machines executing inside containers. Containerization is an operating system level virtualization environment that provides a way to isolate processes (applications). Thus, since a container is typically implemented to contain a process, anything that executes within a container is viewed by other entities as a process from a networking perspective. These entities are viewed as Layer 4 entities, which refers to networking Layer 4 of network communication protocols (e.g., L4, transport layer). In many cloud based implementations, containers can be implemented to include not only processes, but virtual machines (VMs) as well. Since a VM is a virtualized computer, it should be viewed by other entities as a computer from a networking perspective. These entities are viewed as Layer 2 entities, which refers to networking Layer 2 of network communication protocols (e.g., L2, data link layer). However, a VM executing within a container could be viewed as a process (L4) rather than a computer (L2) by other entities within the network.

Some conventional systems can mitigate these problems by relying on the operating system to handle the networking translations between varying network protocol layers. This, however, eliminates any expected userspace networking benefits since unnecessary translation between process and machine networking layers would be needed for a containerized VM to communicate with any other process outside of the container. Some other systems implement translation gateways that can handle process to process communications, but these types of solutions are "symmetric" as they typically support endpoints that communicate using the same networking layer (e.g., both endpoints communicate as L2 entities). Still other systems implement userspace networking solutions to conduct communication translation between the containerized VM and external processes by adding translation logic to the VM itself or the hypervisor that manages that VM. These solutions, however, are inflexible and not scalable since they are tied directly to a particular VM. Thus, any communication translation would be restricted to the same machine executing the VM.

Aspects of the present disclosure address the above noted and other deficiencies by implementing an asymmetric proxy to facilitate userspace networking translation between entities within a network that may each need visibility to different layers of networking traffic. The term "asymmetric" indicates that the proxy disclosed herein supports endpoints that communicate using different networking layers (e.g., one endpoint communicates as an L2 entity and another endpoint communicates as an L4 entity). The asymmetric proxy can be placed connected to an L2 entity (a containerized VM) that is exposed to other entities within a network as a process (L4). The proxy can then perform network communication translation between the L2 entity and other L4 entities in the network. The asymmetric proxy can receive requests from an L4 entity (the "northbound" network/entity), and "unwrap" the networking layers of the request (or the packets, frames, components, etc., of the request) associated with the L4 entity. The asymmetric proxy may then "rewrap" the request to be compatible with the destination L2 entity, and forward the translated request to the L2 entity using a communication method other than the operating system network stack (e.g., using a communication tunnel). Similarly, the asymmetric proxy can receive requests from the L2 entity, convert the request to be compatible with a destination L4 entity, and forward the request to that L4 entity. Thus, aspects of the present disclosure can provide the benefits of userspace networking in a network architecture that includes varying levels of network layer communications between endpoints.

Aspects of the present disclosure present significant advantages over conventional solutions to the issues noted above. First, the asymmetric proxy can be implemented in a generic fashion. In other words, it can connect one endpoint to any userspace L2 networking system. Notably, the asymmetric proxy as described herein can be implemented without complete integration into a specific VM to service that VM. Additionally, the asymmetric proxy can function on different machines from those executing the connected endpoint entities/networks without loss of performance. Moreover, the asymmetric proxy provides added benefit over conventional symmetric solutions since the asymmetric proxy can expose itself as a regular process to L4 network endpoints and as a lower level networking entity to L2 network endpoints. Thus, the performance benefits of userspace networking may be improved for networks that include asymmetric networking endpoints, since any additional networking efforts that would otherwise be replicated by the operating system can be eliminated.

FIG. 1 is a block diagram of a network architecture 100 in which implementations of the disclosure may operate. In some implementations, the network architecture 100 may be used in a containerized computing services platform. A containerized computing services platform may include a Platform-as-a-Service (PaaS) system, such as OpenShift®. The PaaS system provides resources and services (e.g., micro-services) for the development and execution of applications owned or managed by multiple users. A PaaS system provides a platform and environment that allow users to build applications and services in a clustered compute environment (the "cloud") Although implementations of the disclosure are described in accordance with a certain type of system, this should not be considered as limiting the scope or usefulness of the features of the disclosure. For example, the features and techniques described herein can be used with other types of multi-tenant systems and/or containerized computing services platforms.

As shown in FIG. 1, the network architecture 100 includes a cloud-computing environment 130 (also referred to herein as a cloud) that includes nodes 111, 112, 121 to execute applications and/or processes associated with the applications. A "node" providing computing functionality may provide the execution environment for an application of the PaaS system. In some implementations, the "node" may refer to a virtual machine (VM) that is hosted on a physical machine, such as host 1 110 through host N 120, implemented as part of the cloud 130. For example, nodes 111 and 112 are hosted on physical machine of host 1 110 in cloud 130 provided by cloud provider 104. In some implementations, an environment other than a VM may be used to execute functionality of the PaaS applications. When nodes 111, 112, 121 are implemented as VMs, they may be executed by operating systems (OSs) 115, 125 on each host machine 110, 120.

In some implementations, the host machines 110, 120 are often located in a data center. Users can interact with applications executing on the cloud-based nodes 111, 112, 121 using client computer systems, such as clients 160, 170 and 180, via corresponding client software 161, 171 and 181. Client software 161, 171, 181 may include an application such as a web browser. In other implementations, the applications may be hosted directly on hosts 1 through N 110, 120 without the use of VMs (e.g., a "bare metal" implementation), and in such an implementation, the hosts themselves are referred to as "nodes".

Clients 160, 170, and 180 are connected to hosts 110, 120 in cloud 130 and the cloud provider system 104 via a network 102, which may be a private network (e.g., a local area network (LAN), a wide area network (WAN), intranet, or other similar private networks) or a public network (e.g., the Internet). Each client 160, 170, 180 may be a mobile device, a PDA, a laptop, a desktop computer, a tablet computing device, a server device, or any other computing device. Each host 110, 120 may be a server computer system, a desktop computer or any other computing device. The cloud provider system 104 may include one or more machines such as server computers, desktop computers, etc.

In one implementation, the cloud provider system 104 is coupled to a cloud controller 108 via the network 102. The cloud controller 108 may reside on one or more machines (e.g., server computers, desktop computers, etc.) and may manage the execution of applications in the cloud 130. In some implementations, cloud controller 108 receives commands from PaaS system controller 140. In view of these commands, the cloud controller 108 provides data (e.g., such as pre-generated images) associated with different applications to the cloud provider system 104. In some implementations, the data may be provided to the cloud provider 104 and stored in an image repository 106, in an image repository (not shown) located on each host 110, 120, or in an image repository (not shown) located on each node 111, 112, 121. This data may be used for the execution of applications for a multi-tenant PaaS platform managed by the PaaS system controller 140.

In one implementation, the data used for execution of applications can include application images built from pre-existing application components and source code of users managing the application. An image may refer to data representing executables and files of the application used to deploy functionality for a runtime instance of the application. In one implementation, the image can be built using a Docker™ tool and is referred to as a Docker image. In other implementations, the application images can be built using other types of containerization technologies. An image build system (not pictured) can generate an application image for an application by combining a preexisting ready-to-run application image corresponding to core functional components of the application (e.g., a web framework, database, etc.) with source code specific to the application provided by the user. The resulting application image may be pushed to image repository 106 for subsequent use in launching instances of the application images for execution in the PaaS system.

Upon receiving a command identifying specific data (e.g., application data and files, such as application images, used to initialize an application on the cloud) from the PaaS system controller 140, the cloud provider 104 retrieves the corresponding data from the image repository 106, creates an instance of it, and loads it to the hosts 110, 120 to run on nodes 111, 112, 121, 122. In addition, a command may identify specific data to be executed on one or more of the nodes 111, 112, 121, and 122. The command may be received from the cloud controller 108, from the PaaS system controller 140, or a user (e.g., a system administrator) via a console computer or a client machine. The image repository 106 may be local or remote and may represent a single data structure or multiple data structures (databases, repositories, files, etc.) residing on one or more mass storage devices, such as magnetic or optical storage based discs, solid-state-drives (SSDs) or hard drives.

In some embodiments, each of nodes 111, 112, 121, 122 can host one or more containers 113, 114, 123, 124. Each of the containers may be a secure process space on the nodes 111, 112, 121 and 122 to execute the functionality of an application and/or service. In some implementations, a container is established at the nodes 111, 112, 121 and 122 with access to certain resources of the underlying node, including memory, storage, etc. In one implementation, the containers may be established using the Linux Containers (LXC) method, cgroups, SELinux™, and kernel namespaces, etc. A container may serve as an interface between a host machine and a software application. The software application may comprise one or more related processes and may provide a certain service (e.g., an HTTP server, a database server, etc.). Containerization is an operating-system-level virtualization environment of a host machine that provides a way to isolate service processes (e.g., micro-service processes). At the same time, employing the containers makes it possible to develop and deploy new cloud-based micro-services in a cloud-based system. In some embodiments, one or more virtual machines may execute within any of containers 113, 114, 123, 124.

Each of nodes 111, 112, 121, 122 can host one or more applications and/or services. Each of the services may correspond to an application and/or one or more components of the application and may provide one or more functionalities of the application. Examples of the services may include a web server, a database server, a middleware server, etc. Each of the services may run as an independent process in a suitable machine (e.g., a container, a virtual machine, a physical machine, etc.). A service running in system 100 may communicate with one or more other services in system 100. In one implementation, an application may be deployed as one or more services on one or more nodes 111, 112, 121, 122. Each of the services may be deployed in one or more containers. In some implementations, a service may be an application. "Application" and "service" are used herein interchangeably.

In some embodiments, an application may be deployed as a plurality of services (e.g., micro-services) on one or more of the nodes. Each of the services may be hosted by one or more containers. More particularly, for example, multiple replicas of a service may be host by a plurality of containers running on one or more nodes. Each of the replicas may represent an instance of the service and may provide the same functionality of the service.

In some implementations, the PaaS system controller 140 may include an asymmetric proxy 145 that facilitates user-space networking within the cloud-based PaaS system described above. As described herein, the asymmetric proxy 145 can provide communication translation between networks needing visibility to different layers of networking traffic. For example, in some implementations, the asymmetric proxy 145 can provide network communication translation between entities that operate under networking Layer 2 and entities that operate under networking Layer 4. Thus, the translation provided by asymmetric proxy 145 is "asymmetric" in that the two networks communicate using and need visibility into different levels of networking protocols.

A VM, as a virtualized computer, may operate as a Layer 2 entity from a networking perspective. Networking Layer 2 is also known as "L2", "Data Link Layer," "Medium Access Control (MAC) Layer" or the like. Networking Layer 2 provides node-to-node data transfer (e.g., a link between two directly connected nodes), defining the protocol to establish and terminate a connection between two physically connected devices as well as the protocol for flow control between them. A container (e.g., containers 113, 14, 123, 124) is viewed within the network 100 as a process, and thus is viewed within as a Layer 4 entity from a networking perspective. Layer 4 is also known as "L4," "Transport Layer," "Transmission Control Protocol (TCP)/User Datagram Protocol (UDP) Layer," etc. Networking Layer 4 provides host-to-host communication services for applications such connection-oriented communication, reliability, flow control, multiplexing, monitoring, performance, and security. Thus, any entity attempting to communicate with a container may operate using L4 protocols.

The asymmetric proxy 145 can translate network communication between L4 entities (e.g., applications executing on clients 160, 170, 180) and L2 entities that are viewed as L4 entities within the network (VMs executing within containers 113, 114, 123, 124). In some implementations, asymmetric proxy 145 can receive a request from an L4 entity (e.g., a "northbound" network). For example, a web browser application executing on a client device (e.g., client software 161, 171, 181 executing on client 160, 170, 180) may send a request within the network to access a web server. In various implementations, the web server may be provided by a VM executing within a container (e.g., container 113, 114, 123, 124). Asymmetric proxy 145 may be configured to receive requests from the L4 entity (e.g., the "northbound" entity/network), translate the L4 networking layer information in the request to be compatible with an entity that expects L2 networking layer communications (e.g., the "southbound" entity/network), and provide the translated request to the L2 entity. Additionally, any responses to the request that are provided by the L2 entity can be similarly translated and provided back to the requesting L4 entity.

As noted previously, asymmetric proxy 145 can operate as a process executing in userspace of a computing device (or container, virtual machine, etc.) within the network 100. Asymmetric proxy 145 can operate in conjunction with the operating system (e.g., the kernel) of the associated computing device on which it executes. For example, requests received from an L4 entity can be received by asymmetric proxy 145 via the associated operating system. The asymmetric proxy 145 can notify the operating system to forward requests from the L4 entity to the proxy rather than attempting to identify the destination for the request. For example, asymmetric proxy 145 can notify the operating system that the proxy will "listen" on a particular port for received requests, so any request received on that port should be forwarded to the proxy as the destination (rather than the actual L2 destination entity).

Once the request has been received, asymmetric proxy 145 can "unwrap" the request to remove any attributes associated with the source L4 entity and store that information in flow mapping data 146 for later use. Asymmetric proxy can then "rewrap" the request to identify the proxy process as the source and identify the appropriate L2 entity as the destination. In some implementations, the asymmetric proxy 145 can be configured to provide the proxy service for a particular L2 entity or entities. For example, asymmetric proxy 145 can be configured with networking attributes associated with a particular L2 entity (e.g., stored in flow mapping data 146) so that any requests received from an L4 entity are specifically forwarded to the particular L2 entity. Similarly, asymmetric proxy 145 may include attributes for multiple destination L2 entities and may choose an L2 entity to which to forward the request based on information associated with the request. For example, the proxy could "listen" to multiple ports and forward received request to different L2 entities based on the port.

In implementations, asymmetric proxy 145 can bypass the networking functionality of the operating system when forwarding the request to the destination L2 entity. For example, rather than forward the request using the networking capabilities native to the operating system (which would result in an L4 type communication), asymmetric proxy 145 can initiate a tunnel connection directly to the L2 entity so that the request may be passed as an L2 type communication. Responses may then be received by the proxy from the L2 entity over the tunnel connection, unwrapped, rewrapped to be compatible with the L4 entity, and forwarded to the original source of the request.

Similarly, asymmetric proxy 145 may be configured to service requests received from an L2 entity to be provided to an L4 entity. For example, a VM executing within a container may provide a virtualized desktop environment for a user. The user may execute a browser application within the VM to access a web server that executes on one of clients 160, 170, 180 that operate as L4 entities. Asymmetric proxy 145 can receive the request through the tunnel connection, unwrap the request to remove information associated with the L2 entity and store that information in flow mapping data 146 to be used to wrap the response. The asymmetric proxy 145 may then identify the destination entity based on the contents of the request and open a connection to the destination entity via standard networking protocols provided by the operating system. Asymmetric proxy 145 may then forward the request to the destination L4 entity without rewrapping the request since that functionality can be provided by the operating system. When a response is received from the L4 entity, asymmetric proxy 145 can rewrap the response with the appropriate networking information associated with the L2 source entity. This information may be retrieved from data stored in flow mapping data 146. The response may then be forwarded to the L2 source entity using the tunnel connection.

While implementations described above and further below illustrate an asymmetric proxy providing translation between an L4 northbound entity and L2 southbound entity, aspects of the present disclosure can be implemented with northbound and southbound entities that rely on different networking layer communications that those described. Implementing the asymmetric proxy 145 to service requests from an L4 entity is described in further detail below with respect to FIG. 2. Implementing the asymmetric proxy 145 to service requests from an L2 entity is described in further detail below with respect to FIG. 3

Figure 2:
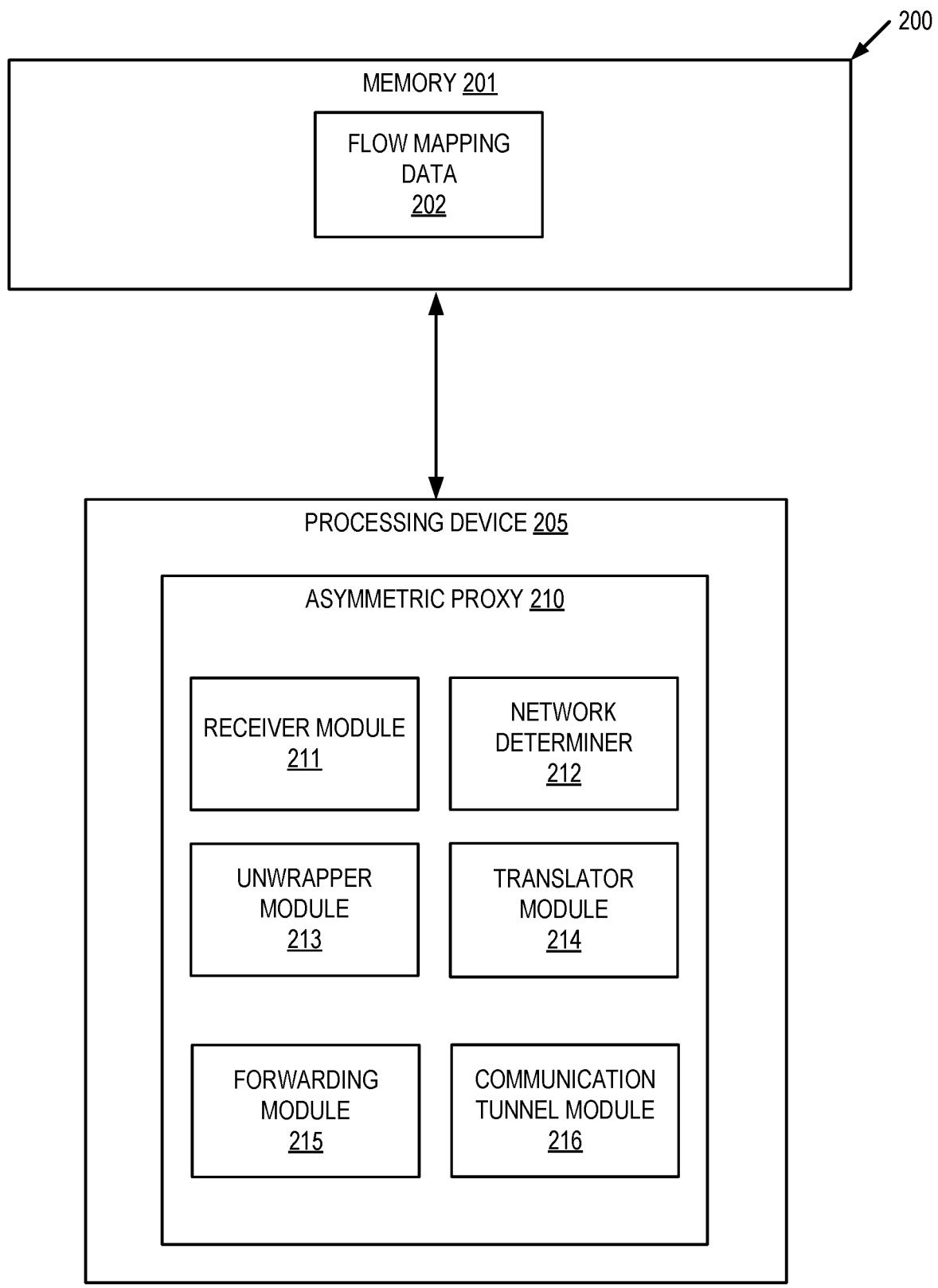
FIG. 2 depicts a block diagram illustrating an example of an asymmetric networking proxy to service requests from an L4 networking entity to be forwarded to an L2 networking entity, in accordance with one or more aspects of the present disclosure.

FIG. 2 depicts a block diagram illustrating an example of an asymmetric proxy 210 for facilitating userspace networking to service requests from an L4 networking entity to be forwarded to an L2 networking entity. In some implementations, asymmetric proxy 210 may correspond asymmetric proxy 145 of FIG. 1. As shown in FIG. 2, asymmetric proxy 210 may be a component of a computing apparatus 200 that includes a processing device 205, operatively coupled to a memory 201, to execute asymmetric proxy 210. In some implementations, processing device 205 and memory 201 may correspond to processing device 802 and main memory 804 respectively as described below with respect to FIG. 8.

Asymmetric proxy 210 may include receiver module 211, network determiner 212, unwrapper module 213, translator module 214, forwarding module 215, and communication tunnel module 216. Alternatively, the functionality of one or more of receiver module 211, network determiner 212, unwrapper module 213, translator module 214, forwarding module 215, and communication tunnel module 216 may be combined into a single module or divided into multiple sub-modules.

Receiver module 211 is responsible for receiving a request from a source network (e.g., a source entity). In some implementations, the source network sends the request at a networking transport layer (e.g., networking layer 4, L4, etc.). As noted above, asymmetric proxy 210 may work in cooperation with the operating system of the system upon which the proxy executes. When operating to service requests from an L4 entity (e.g., the "northbound entity"), receiver module 211 may notify the associated operating system that it may monitor (e.g., "listen" on) a particular communication port to receive those requests. The operating system can the configure the communication port to notify the asymmetric proxy 210 when an incoming request is received on that port. Subsequently, receiver module 211 can detect that a source L4 network has initiated a communication connection using the communication port.

In various implementations, the request can be made up of multiple segments (e.g., packets, frames, etc.) that each are encapsulated by one or more networking layer protocol attributes. For example, for each layer of the networking protocol, the request data can be encapsulated by header information that identifies attributes for that particular layer. For example, the L2 header may include a MAC address attribute, and the L4 header may include a TCP/UDP address attribute. Similarly, other layers of the networking protocol may also have respective header information that identifies attributes necessary to direct the request through the network as well as identify the source of the request.

Network determiner 212 is responsible for determining a destination network (e.g., a destination entity) associated with the request received by receiver module 211. In some implementations, the destination network communicates at a networking data link layer (e.g., networking layer 2, L2, etc.). The network determiner 212 can determine the destination L2 network based on information encapsulated in the request. For example, when the received request is unwrapped, any networking attributes in the request (or the packets, frames, etc. that make up the request) that may be associated with the destination network may be extracted and used to determine the destination network.

Alternatively, the asymmetric proxy 210 may be configured to service requests for a particular (or a group of particular) destination networks. For example, one instance of an asymmetric proxy 210 may be instantiated to perform translation services for a web server executed by a particular VM inside a container. The asymmetric proxy 210 may be configured with the networking attributes (e.g., any network identifiers, IP address, MAC address, or other information that may be used to identify the destination) needed to forward requests appropriately. In some implementations, these attributes may be received by the proxy at proxy startup, and stored in memory 201 (e.g., in flow mapping data 202). In some implementations, the proxy may be configured to service requests intended for multiple destination networks. In such instances, the proxy can forward messages to a destination based on the port over which the request was received. A mapping of port number to destination network may be stored in flow mapping data 202.

Unwrapper module 213 is responsible unwrapping the networking layers of the received request to prepare it to be forwarded to the identified destination network. In some implementations, unwrapper module 213 unwraps the request by removing information associated with the source network from one or more networking layers of the request. As noted above, the proxy removes any information in the request that is associated with the source network so that the forwarded request appears to have originated from the proxy itself. Unwrapper module then stores the information associated with the source network in a memory space (e.g., flow mapping data 202).

Translator module 214 is responsible for translating (e.g., re-wrapping) the networking layers of the request to include information associated with the destination network. Translator module 214 can conduct the translation by first determining the networking attributes associated with asymmetric proxy 210. In some implementations, this information can be retrieved from information stored in memory 201 (e.g., flow mapping data 202). Translator module 214 can then replace the information associated with the source network with at least one of the networking attributes associated with the asymmetric proxy in the networking layers of the request. For example, translator module 214 can modify any relevant information in headers of the networking layers of the request that might identify the source of the request. Subsequently, translator module 214 may then insert one or more networking attributes associated with the actual destination network (e.g., the L2 entity) into the applicable networking layers of the request. In some implementations, the networking attributes of the destination network are determined by network determiner 212 as described above.

In various implementations, translator module 214 can re-wrap the request such that only the necessary networking layers expected by the destination network are included. For example, if the destination network is an L2 network, translator module 214 can re-wrap the networking layers for L4, L3, and L2 with modified networking attributes. Since the destination network expects L2 level communication, translator module 214 may omit any L1 (e.g., physical layer) information.

Forwarding module 215 is responsible for sending the request to the destination network. In some implementations, the request is sent to the destination network at the L2 networking layer (e.g., the networking data link layer). As noted above, an L2 network that executes within a container may be viewed by services outside the container as an L4 entity. Thus, forwarding module 215 may forward the request without going through the network stack of the operating system, since the destination network may be expecting communication at the L2 level and not L4. In such instances, forwarding module 215 can invoke communication tunnel module 216 (described below) to establish a tunnel connection to the destination network without involving the network stack of the operating system. Forwarding module 215 then sends the request to the destination network over the tunnel connection. In this way, the request may be forwarded to an L2 network directly even though the requests originated from a L4 network.

Communication tunnel module 216 is responsible for initiating a tunnel connection to the destination network using a tunneling protocol. Communication tunnel module 216 may establish the connection responsive to determining that a request has been translated for the appropriate destination network. In some implementations, communication tunnel module 216 may establish the tunnel connection to the destination L2 network responsive to receiving an initial request and maintain the tunnel connection to the destination L2 network active for subsequently received requests. In such cases, multiple requests may be sent over the same tunnel connection (e.g., multiple L4 network requests may be multiplexed over the same tunnel connection to the L2 destination network). Alternatively, communication tunnel module 216 may initiate the connection for each request, and close the connection when the communication flow between the source and destination networks has completed. In implementations where the asymmetric proxy 210 services requests for a particular destination network, communication tunnel module 216 may establish the initial connection when the proxy starts up and maintain the tunnel until a request is received to terminate the connection.

Subsequently, when a response to any forwarded request is received from the destination network, asymmetric proxy 210 may again be invoked to process the response, translate the response into a format compatible with the source network and forward that response to the source network. A response may be received by receiver module 211 over the tunnel connection. As noted above, the destination network (L2 network) may send the response at the networking data link layer (e.g., L2). Unwrapper module 213 may then be invoked to remove (e.g., unwrap) the information associated with the destination network (e.g., the L2 network) from the networking layers of the response (e.g., the networking headers of the response or the packets, frames, etc., that make up the response).

Network determiner 212 may then be invoked to determine the source network associated with the response. In other words, network determiner 212 determines the source network that sent the request that resulted in the response from the destination network. In some implementations, information identifying the source network may be stored in flow mapping data 202 when the request is received and associated with the forwarded request so that when the response is received, network determiner 212 can easily identify the origin of the request. Network determiner 212 may then retrieve the information associated with the source network from the memory space.

Translator module 214 may then be invoked to translate the networking layers of the response to include information associated with the source network. In other words, translator module 214 rewraps the response with the appropriate networking attributes associated with the source network that are expected by the source network in the received response. Similarly, translator module 214 may replace any network information in the networking layers of the response that are expected to be associated with the networking information of the proxy itself. For example, since the source network views the proxy as the other end of the communication flow, any information that identifies the source of the response would identify the proxy rather than the actual L2 network that produced the response.

Subsequently, receiver module 211 may receive a request from the source network (the L4 network) to terminate the connection to the destination network (the L2 network). Since the source network may not know specific information about the destination network, the request may be a request to terminate the connection to the proxy. In some implementations, receiver module 211 may interpret this request as terminating only the active connection between the proxy and the source network. Alternatively, receiver module 211 may interpret this request as terminating the end to end connection to the L2 network as well. In such instances, the above process described for a general request may be replicated to process the termination request. Unwrapper module 213 may be invoked to remove information associated with the source network from the networking layers of the termination request. Translator module 214 may then be invoked to translate the networking layers of the termination request to include information associated with the destination network (e.g., the L2 network connected to the proxy by the tunnel connection). Forwarding module 215 may then be invoked to forward the termination request to the destination network over the tunnel connection.

Receiver module 211 may subsequently receive an acknowledgement of the termination request from the destination network over the tunnel connection. In implementations where the end to end connection is to be terminated, receiver module 211 may invoke communication tunnel module 216 to terminate the tunnel connection. In such cases, once the tunnel connection has been terminated, asymmetric proxy 210 may then clear the memory state of the proxy by deleting any stored information associated with the source network from the memory space (e.g., from memory mapping data 202). In some implementations, the tunnel connection may be maintained for subsequent requests. As such, the tunnel connection may not be terminated when a termination request is received from the source L4 network. In such instances, receiver module 211 may receive the acknowledgement of the termination request from the destination network over the tunnel connection, causing asymmetric proxy 210 to clear the memory state of the proxy by deleting any stored information associated with the source network from the memory space (e.g., from memory mapping data 202) without terminating the tunnel connection between the proxy and the destination network.

Figure 3:
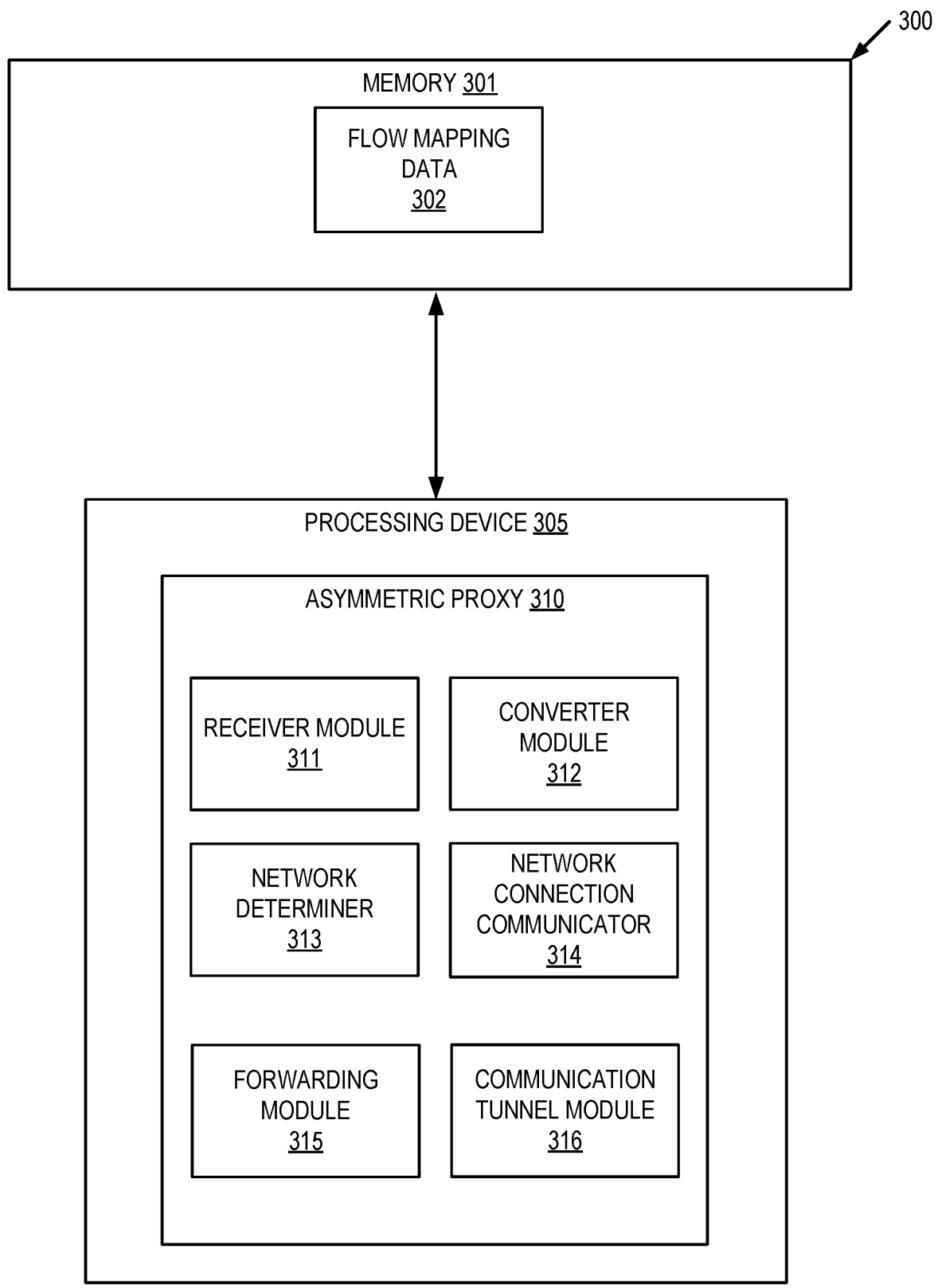
FIG. 3 depicts a block diagram illustrating an example of an asymmetric networking proxy to service requests from an L2 networking entity to be forwarded to an L4 networking entity, in accordance with one or more aspects of the present disclosure.

FIG. 3 depicts a block diagram illustrating an example of an asymmetric proxy 310 for facilitating userspace networking to service requests from an L2 networking entity to be forwarded to an L4 networking entity. In some implementations, asymmetric proxy 310 may correspond asymmetric proxy 145 of FIG. 1. As shown in FIG. 3, asymmetric proxy 310 may be a component of a computing apparatus 300 that includes a processing device 305, operatively coupled to a memory 301, to execute asymmetric proxy 310. In some implementations, processing device 305 and memory 301 may correspond to processing device 802 and main memory 804 respectively as described below with respect to FIG. 8.

Asymmetric proxy 310 may include receiver module 311, converter module 312, network determiner 313, network connection communicator 314, forwarding module 315, and communication tunnel module 316. Alternatively, the functionality of one or more of receiver module 311, converter module 312, network determiner 313, network connection communicator 314, forwarding module 315, and communication tunnel module 316 may be combined into a single module or divided into multiple sub-modules.

Receiver module 311 is responsible for receiving a request from a source network (e.g., a source entity). In some implementations, the source network sends the request at a networking data link layer (e.g., networking layer 2, L2, etc.). As noted above, asymmetric proxy 310 may communicate with an L2 entity (e.g., the southbound network) using a tunneling connection rather than via the networking stack of the operating system. When operating to service requests from an L2 entity, receiver module 311 may invoke communication tunnel module 316 to establish the tunnel connection to the L2 destination network.

Communication tunnel module 316 is responsible for initiating a tunnel connection to the destination network using a tunneling protocol. As noted above with respect to FIG. 2, in implementations where the asymmetric proxy 310 services requests from a particular L2 source network, communication tunnel module 316 may establish the initial connection when the proxy starts up and maintain the tunnel until a request is received to terminate the connection. In some implementations, communication tunnel module 316 may receive network configuration settings associated with the L2 source network and initiate the tunnel connection using a tunneling protocol in view of the network configuration settings.

As noted above, the asymmetric proxy 210 may be configured to service requests from a particular L2 source network. For example, one instance of an asymmetric proxy 310 may be instantiated to perform translation services for a client desktop application executed by a particular VM inside a container. For example, a client desktop running a web browser. The asymmetric proxy 310 may be configured with the networking attributes (e.g., any network identifiers, IP address, MAC address, or other information that may be used to identify the source) needed to connect to the client desktop and receive requests appropriately. In some implementations, these attributes may be received by the proxy at proxy startup, and stored in memory 301 (e.g., in flow mapping data 302). In some implementations, the proxy may be configured to service requests from multiple destination networks, each with its own corresponding tunnel connection.

Converter module 312 is responsible for converting the request (or the networking packets, frames, etc. that make up the request) for compatibility with the destination L4 network. In some implementations, converter module 312 completes this operation by unwrapping the networking layers of the received request to prepare it to be forwarded to the identified destination network. Converter module 312 can first remove information associated with the source L2 network from the networking layers of the request and store that information in a memory space of memory 301 (e.g., memory mapping data 302) for later use in packaging a response.

Network determiner 313 is responsible for determining a destination network (e.g., a destination entity) associated with the request received by receiver module 311. In some implementations, information that identifies the destination L4 network for the request is included on the request from the L2 source network. For example, if the request from the L2 source network is generated by a browser application to view a web page, information identifying the web page may be included in the request. Once converter module 312 unwraps the request to remove any networking information associated with proxy and/or the L2 source network, the remaining information should allow network determiner 313 to identify the destination network.

Network connection communicator 314 is responsible for initiating a networking connection to the destination network identified by network determiner 313. In some implementations, network connection communicator 314 can establish this connection via the operating system of the system executing the proxy. Continuing the web page example from above, network connection communicator 314 can then send a request to the operating system to initiate the networking connection to the applicable IP address associated with the web page. Forwarding module 315 may then be invoked to forward the request.

Forwarding module 315 is responsible for sending the request to the destination network over the networking connection initiated by network connection communicator 314. In some implementations, the request is sent to the L4 destination network at the network transport layer (e.g., L4). As described above, since the L4 network expects L4 level communications, forwarding module 315 may utilize the networking capabilities of the operating system to forward the request without performing any additional re-wrapping operation. Thus, forwarding module 315 can send the request to the networking stack of the operating system and allow the operating system to complete the communication.

Subsequently, when a response to any forwarded request is received from the L4 destination network, asymmetric proxy 310 may again be invoked to process the response, translate the response into a format compatible with the L2 source network and forward that response to the L2 source network. A response may be received by receiver module 311 over the standard networking connection established in conjunction with the operating system. As noted above, the destination network (L4 network) may send the response at the networking transport layer (e.g., L4). The operating system may receive this response via its own networking stack, perform any unwrapping necessary to strip the networking layers from the response (e.g., the networking headers of the response or the packets, frames, etc., that make up the response), and return the unwrapped response to receiver module 311. Thus, asymmetric proxy 310 may process the response data without performing any unwrapping.

Network determiner 313 may then be invoked to determine the source network associated with the response. In other words, network determiner 313 determines the source network that sent the request that resulted in the response from the destination network. In some implementations, information identifying the source network may be stored in flow mapping data 302 when the request is received and associated with the forwarded request so that when the response is received, network determiner 313 can easily identify the origin of the request. Network determiner 313 may then retrieve the information associated with the source network from the memory space (e.g., flow mapping data 302).

Converter module 312 may then be invoked to rewrap the response with the appropriate networking attributes associated with the L2 source network that are expected by the source network in the received response. In some implementations, converter module 312 inserts at least a portion of the information associated with the source network into the networking layers of the response (or packets, frames, etc. that make up the response). Forwarding module 325 may then be invoked to forward the response to the L2 source network over the communication tunnel connection using the tunnel protocol.

Subsequently, receiver module 311 may receive a request from the L2 source network to terminate the connection to the L4 destination network. Converter module 312 may be invoked to unwrap the termination request and convert it for compatibility with the L4 destination network. Forwarding module 315 may then be invoked to send the termination request to the L4 destination network over the network connection. Receiver module 311 may receive an acknowledgement of the termination request from the L4 destination network over the network connection and send a request to the operating system to terminate the network connection to the L4 destination network.

Once the network connection has been terminated, asymmetric proxy 210 may then invoke converter module 312 to rewrap the acknowledgment with the appropriate networking attributes associated with the L2 source network that are expected by the source network in the received acknowledgment. In some implementations, converter module 312 inserts at least a portion of the information associated with the source network into the networking layers of the acknowledgment (or packets, frames, etc. that make up the acknowledgment). Forwarding module 325 may then be invoked to forward the acknowledgment to the L2 source network over the communication tunnel connection using the tunnel protocol.

In some implementations, receiver module 311 may interpret the termination request from the L2 source network to terminate the tunnel connection as well. In such instances, communication tunnel module 316 may be invoked to terminate the tunnel connection. In some implementations, once the tunnel connection has been terminated, asymmetric proxy 310 may then clear the memory state of the proxy by deleting any stored information associated with the L2 source network from the memory space (e.g., from memory mapping data 302).

Figure 4:
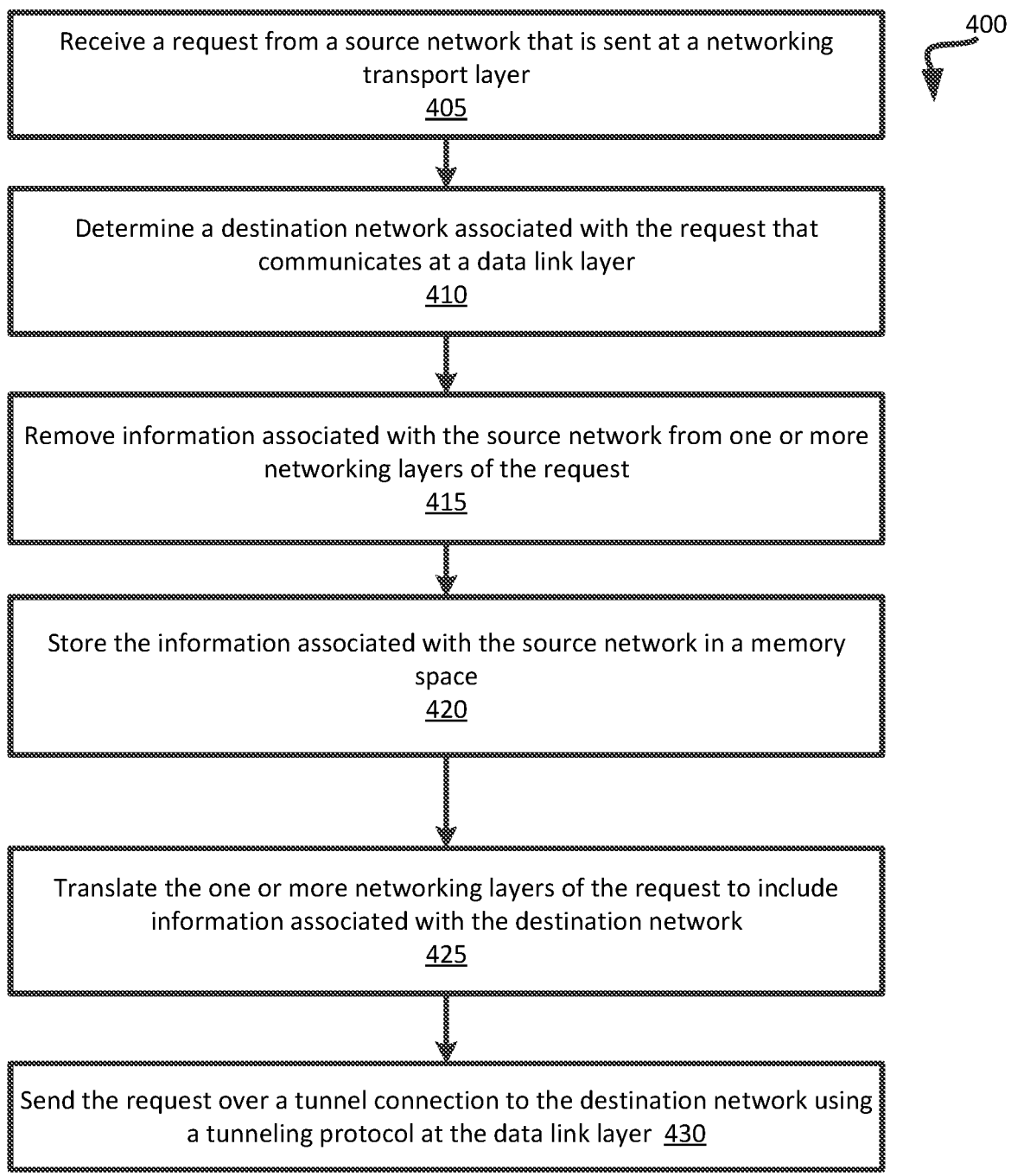
FIG. 4 depicts a flow diagram illustrating an asymmetric proxy that services requests from an L4 networking entity to be forwarded to an L2 networking entity, in accordance with one or more aspects of the present disclosure.

FIG. 4 depicts a flow diagram of an example method 400 for an asymmetric proxy that services requests from an L4 networking entity to be forwarded to an L2 networking entity. The method may be performed by processing logic that may comprise hardware (circuitry, dedicated logic, etc.), computer readable instructions (run on a general purpose computer system or a dedicated machine), or a combination of both. In an illustrative example, method 400 may be performed by asymmetric proxy 145 in FIG. 1, or asymmetric proxy 210 in FIG. 2. Alternatively, some or all of method 400 might be performed by another module or machine. It should be noted that blocks depicted in FIG. 4 could be performed simultaneously or in a different order than that depicted.

At block 405, processing logic receives a request from a source network. In some implementations, the source network sends the request at a networking transport layer. At block 410, processing logic determines a destination network associated with the request. In some implementations, the destination network communicates at a networking data link layer. At block 415, processing logic removes information associated with the source network from one or more networking layers of the request. At block 420, processing logic stores the information associated with the source network in a memory space. At block 425, processing logic translates the one or more networking layers of the request to include information associated with the destination network. At block 430, processing logic sends the request to the destination network over a tunnel connection to the destination network using a tunneling protocol. In some implementations, the request is sent to the destination network at the networking data link layer. After block 430, the method of FIG. 4 terminates.

Figure 5:
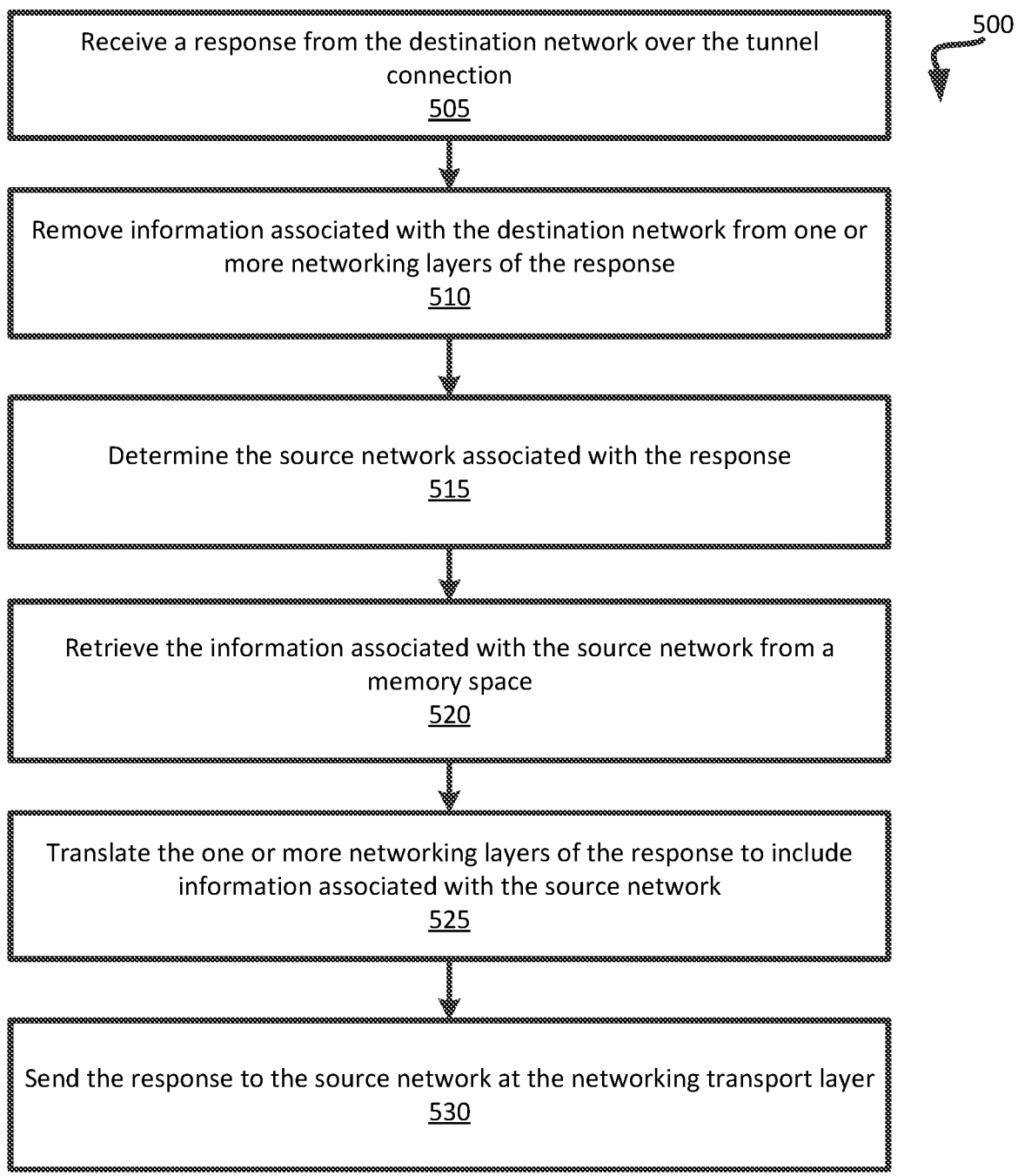
FIG. 5 depicts a flow diagram illustrating an asymmetric proxy that services responses from an L2 networking entity to be returned to an L4 networking entity, in accordance with one or more aspects of the present disclosure.

FIG. 5 depicts a flow diagram of an example method 500 for an asymmetric proxy that services responses from an L2 networking entity to be returned to an L4 networking entity. The method may be performed by processing logic that may comprise hardware (circuitry, dedicated logic, etc.), computer readable instructions (run on a general purpose computer system or a dedicated machine), or a combination of both. In an illustrative example, method 500 may be performed by asymmetric proxy 145 in FIG. 1, or asymmetric proxy 210 in FIG. 2. Alternatively, some or all of method 500 might be performed by another module or machine. It should be noted that blocks depicted in FIG. 5 could be performed simultaneously or in a different order than that depicted.

At block 505, processing logic receives a response from the destination network over the tunnel connection, wherein the destination network sends the response at the networking data link layer. At block 510, processing logic removes information associated with the destination network from one or more networking layers of the response. At block 515, processing logic determines the source network associated with the response. At block 520, processing logic retrieves the information associated with the source network from the memory space. At block 525, processing logic translates the one or more networking layers of the response to include information associated with the source network. At block 530, processing logic sends the response to the source network, wherein the response is sent to the source network at the networking transport layer. After block 530, the method of FIG. 5 terminates.

Figure 6:
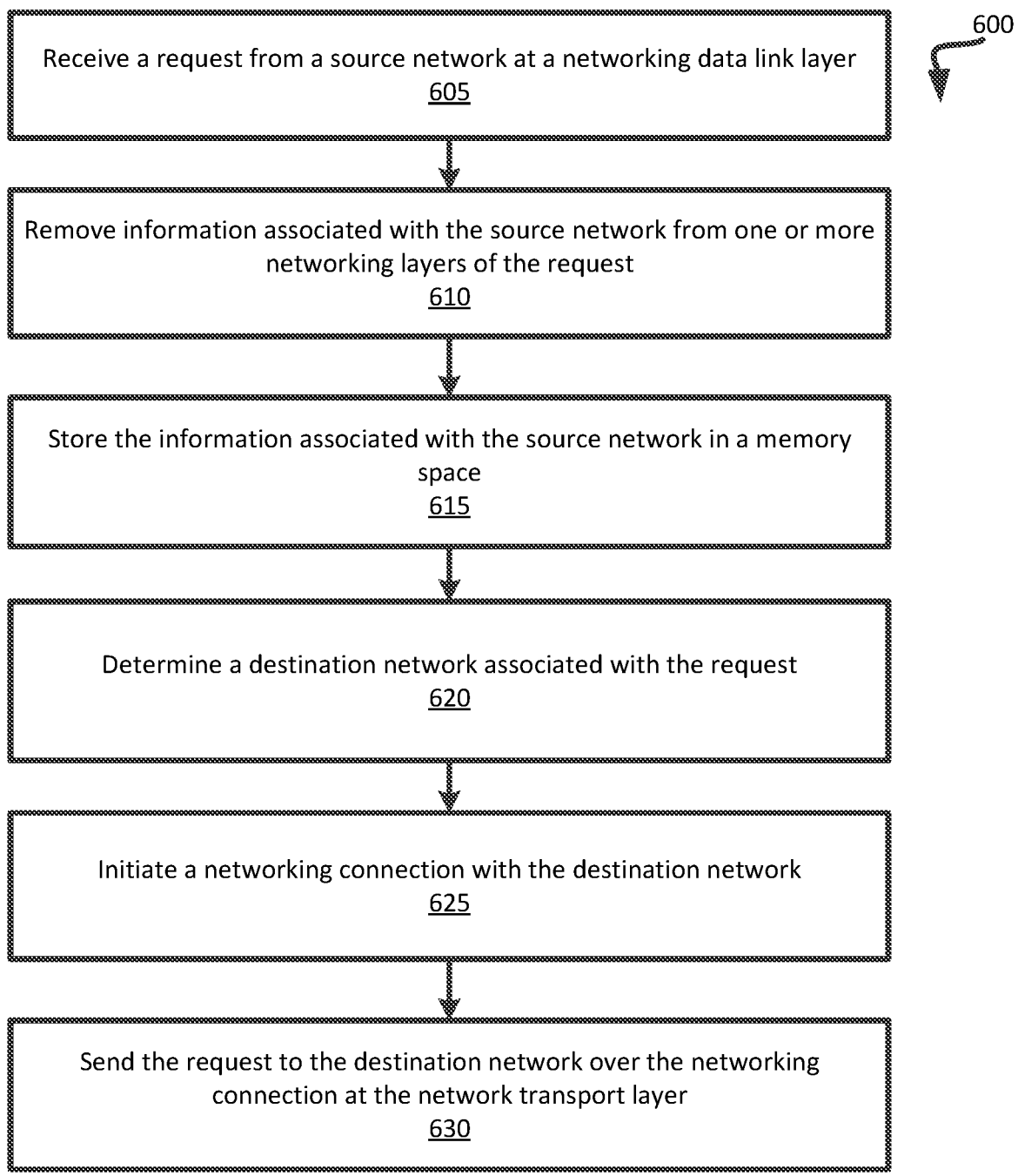
FIG. 6 depicts a flow diagram of a method for an asymmetric proxy that services requests from an L2 networking entity to be forwarded to an L4 networking entity, in accordance with one or more aspects of the present disclosure.

FIG. 6 depicts a flow diagram of an example method 600 for an asymmetric proxy that services requests from an L2 networking entity to be forwarded to an L4 networking entity. The method may be performed by processing logic that may comprise hardware (circuitry, dedicated logic, etc.), computer readable instructions (run on a general purpose computer system or a dedicated machine), or a combination of both. In an illustrative example, method 600 may be performed by asymmetric proxy 145 in FIG. 1, or asymmetric proxy 210 in FIG. 2. Alternatively, some or all of method 600 might be performed by another module or machine. It should be noted that blocks depicted in FIG. 6 could be performed simultaneously or in a different order than that depicted.

At block 605, processing logic receives a request from a source network. In some implementations, the source network sends the request at a networking data link layer. At block 610, processing logic removes information associated with the source network from one or more networking layers of the request. At block 615, processing logic stores the information associated with the source network in a memory space. At block 620, processing logic determines a destination network associated with the request. In some implementations, the destination network communicates at a networking transport layer. At block 625, processing logic initiates a networking connection to the destination network. At block 630, processing logic sends the request to the destination network over the networking connection. In some implementations, the request is sent to the destination network at the networking transport layer. After block 630, the method of FIG. 6 terminates.

Figure 7:
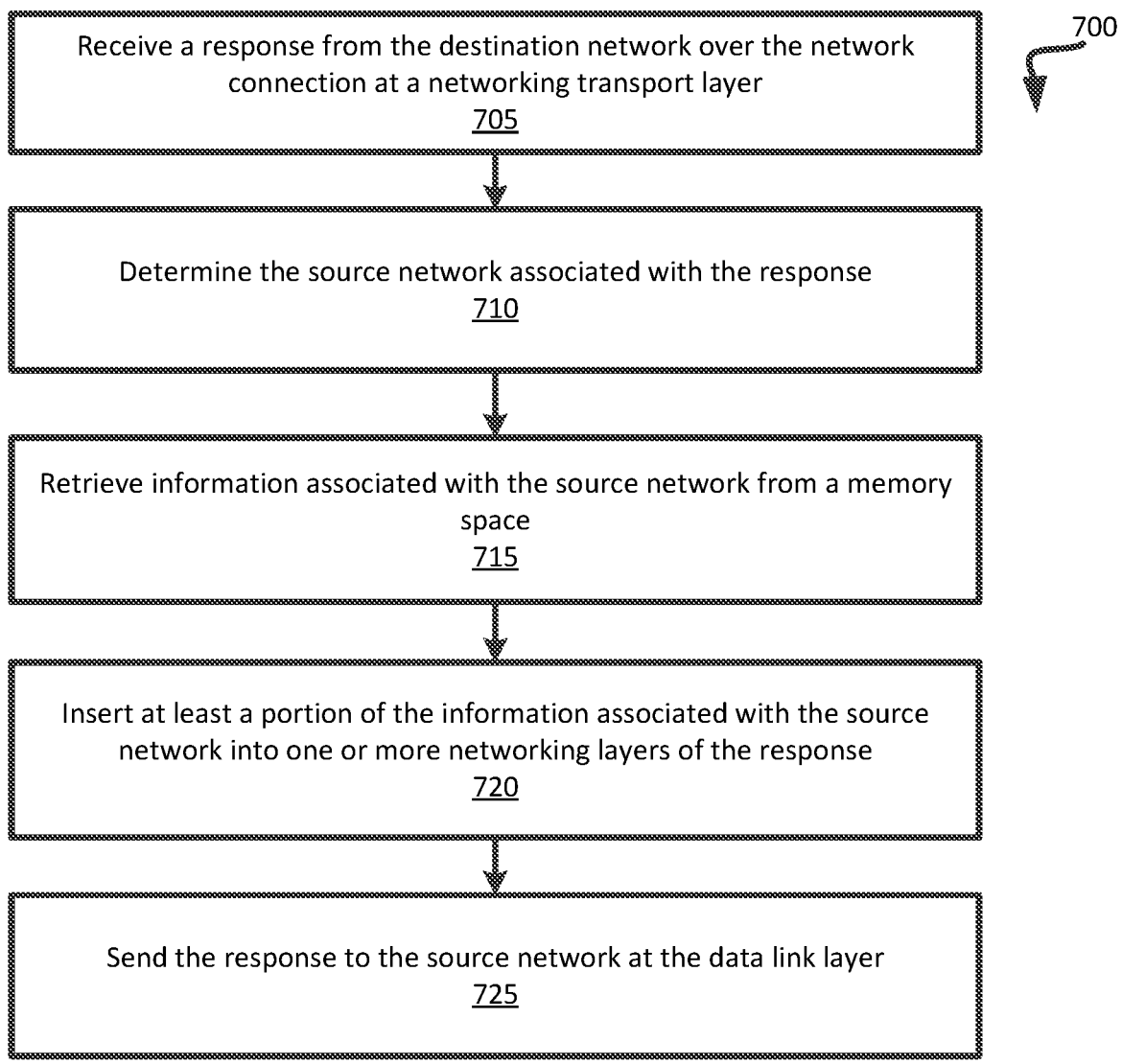
FIG. 7 depicts a flow diagram of a method for an asymmetric proxy that services responses from an L4 networking entity to be returned to an L2 networking entity, in accordance with one or more aspects of the present disclosure.

FIG. 7 depicts a flow diagram of an example method 700 for an asymmetric proxy that services responses from an L4 networking entity to be returned to an L2 networking entity. The method may be performed by processing logic that may comprise hardware (circuitry, dedicated logic, etc.), computer readable instructions (run on a general purpose computer system or a dedicated machine), or a combination of both. In an illustrative example, method 700 may be performed by asymmetric proxy 145 in FIG. 1, or asymmetric proxy 410 in FIG. 4. Alternatively, some or all of method 700 might be performed by another module or machine. It should be noted that blocks depicted in FIG. 7 could be performed simultaneously or in a different order than that depicted.

At block 705, processing logic receives a response from the destination network over the network connection. In some implementations, the destination network sends the response at a networking transport layer. At block 710, processing logic determines the source network associated with the response. At block 715, processing logic retrieves the information associated with the source network from the memory space. At block 720, processing logic inserts at least a portion of the information associated with the source network into one or more networking layers of the response. At block 725, processing logic sends the response to the source network. In some implementations, the response is sent to the source network at the networking data link layer. After block 725, the method of FIG. 7 terminates.

Figure 8:
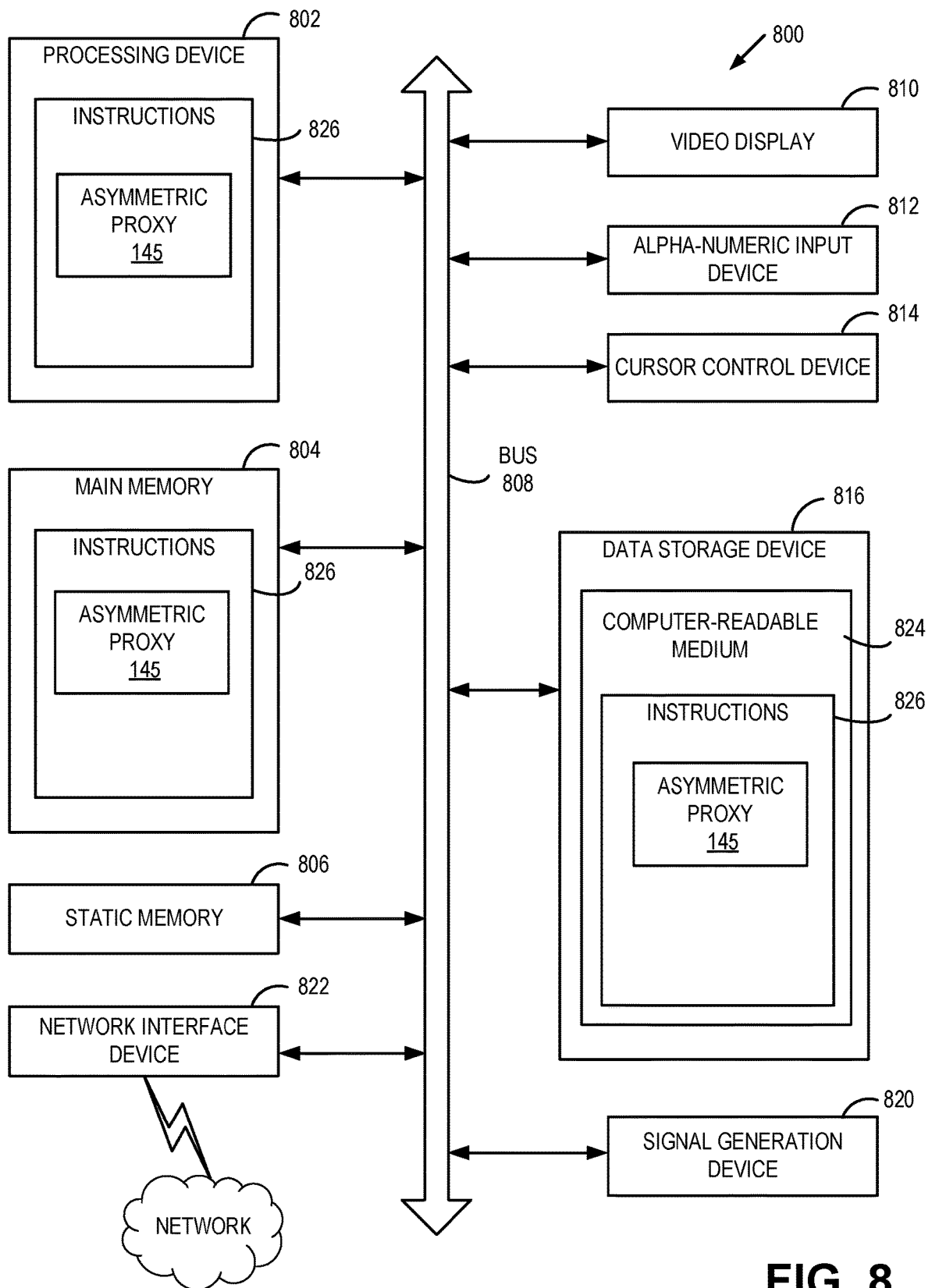
FIG. 8 depicts a block diagram of an illustrative computer system operating in accordance with one or more aspects of the present disclosure.

FIG. 8 depicts an example computer system 800 which can perform any one or more of the methods described herein. In one example, computer system 800 may correspond to computer system 100 of FIG. 1. The computer system may be connected (e.g., networked) to other computer systems in a LAN, an intranet, an extranet, or the Internet. The computer system may operate in the capacity of a server in a client-server network environment. The computer system may be a personal computer (PC), a set-top box (STB), a server, a network router, switch or bridge, or any device capable of executing a set of instructions (sequential or otherwise) that specify actions to be taken by that device. Further, while a single computer system is illustrated, the term "computer" shall also be taken to include any collection of computers that individually or jointly execute a set (or multiple sets) of instructions to perform any one or more of the methods discussed herein.

The exemplary computer system 800 includes a processing device 802, a main memory 804 (e.g., read-only memory (ROM), flash memory, dynamic random access memory (DRAM) such as synchronous DRAM (SDRAM)), a static memory 806 (e.g., flash memory, static random access memory (SRAM)), and a data storage device 816, which communicate with each other via a bus 808.

Processing device 802 represents one or more general-purpose processing devices such as a microprocessor, central processing unit, or the like. More particularly, the processing device 802 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 802 may also be one or more special-purpose processing devices such as an application specific integrated circuit (ASIC), a field programmable gate array (FPGA), a digital signal processor (DSP), network processor, or the like. The processing device 802 is configured to execute processing logic (e.g., instructions 826) that includes asymmetric proxy 145 for performing the operations and steps discussed herein (e.g., corresponding to the methods of FIGS. 6-7, etc.).

The computer system 800 may further include a network interface device 822. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 820 (e.g., a speaker). In one illustrative example, the video display unit 810, the alphanumeric input device 812, and the cursor control device 814 may be combined into a single component or device (e.g., an LCD touch screen).

The data storage device 816 may include a non-transitory computer-readable medium 824 on which may store instructions 826 that include asymmetric proxy 145 (e.g., corresponding to the methods of FIGS. 6-7, etc.) embodying any one or more of the methodologies or functions described herein. Asymmetric proxy 145 may also reside, completely or at least partially, within the main memory 804 and/or within the processing device 802 during execution thereof by the computer system 800, the main memory 804 and the processing device 802 also constituting computer-readable media. Asymmetric proxy 145 may further be transmitted or received over a network via the network interface device 822.

While the computer-readable storage medium 824 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In certain implementations, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

In the above description, numerous details are set forth. It will be apparent, however, to one skilled in the art, that aspects of the present disclosure may be practiced without these specific details. In some instances, well-known structures and devices are shown in block diagram form, rather than in detail, in order to avoid obscuring the present disclosure.

Unless specifically stated otherwise, as apparent from the following discussion, it is appreciated that throughout the description, discussions utilizing terms such as "receiving," "determining," "removing," "storing," "translating," "initiating," "sending," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the specific purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Aspects of the disclosure presented herein are not inherently related to any particular computer or other apparatus. Various general purpose systems may be used with programs in accordance with the teachings herein, or it may prove convenient to construct more specialized apparatus to perform the specified method steps. The structure for a variety of these systems will appear as set forth in the description below. In addition, aspects of the present disclosure are not described with reference to any particular programming language. It will be appreciated that a variety of programming languages may be used to implement the teachings of the disclosure as described herein.

Aspects of the present disclosure may be provided as a computer program product that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not have an ordinal meaning according to their numerical designation.

What is claimed is:

1. A method comprising:
receiving, by a processing device executing an asymmetric proxy, a request from a source network, wherein the request identifies each of a plurality of networking layers and header data associated with each of the plurality of networking layers, and wherein the source network sends the request at a networking transport layer of the plurality of networking layers;
determining a destination network associated with the request, wherein the destination network communicates at a networking data link layer of the plurality of networking layers;
removing, from the request, information from the header data associated with each of the plurality of networking layers that identifies the source network;
storing, in a memory space, the information that is removed from the request;
translating, by the processing device executing the asymmetric proxy, one or more networking layers of the plurality of networking layers of the request to generate a translated request, wherein the translated request comprises information associated with the destination network and information associated with the asymmetric proxy, and wherein the translated request is converted from the networking transport layer supported by the source network to the networking data link layer supported by the destination network; and
sending, using a tunneling protocol, the translated request to the destination network over a tunnel connection between the destination network and the asymmetric proxy, wherein the request is sent to the destination network at the networking data link layer.

2. The method of claim 1, wherein receiving the request comprises:
monitoring a communication port for communication requests; and
detecting that the source network initiated a connection using the communication port.

3. The method of claim 1, wherein determining the destination network comprises:
receiving one or more networking attributes associated with the destination network; and
storing the one or more networking attributes associated with the destination network in the memory space.

4. The method of claim 3, wherein translating the one or more networking layers of the request comprises:
determining one or more networking attributes of the information associated with the asymmetric proxy;
replacing the information associated with the source network with at least one of the one or more networking attributes associated with the asymmetric proxy in one or more of the plurality of networking layers of the request; and
inserting at least one of the one or more networking attributes associated with the destination network into the one or more of the plurality of networking layers of the request.

5. The method of claim 1, further comprising:
receiving a response from the destination network over the tunnel connection, wherein the destination network sends the response at the networking data link layer;
removing information associated with the destination network from one or more networking layers of the response;
determining the source network associated with the response;
retrieving at least a portion of the information associated with the source network that was removed from the request from the source network from the memory space;
translating the one or more networking layers of the response to include the retrieved information associated with the source network; and
sending the response to the source network, wherein the response is sent to the source network at the networking transport layer.

6. The method of claim 1, further comprising:
receiving a termination request from the source network to terminate the connection to the destination network;
removing information associated with the source network from one or more networking layers of the termination request;
translating the one or more networking layers of the termination request to include information associated with the destination network; and
sending the termination request to the destination network over the tunnel connection.

7. The method of claim 6, further comprising:
receiving an acknowledgement of the termination request from the destination network over the tunnel connection;
terminating the tunnel connection to the destination network; and
deleting the information associated with the source network from the memory space.

8. A system comprising:
a memory; and
a processing device, operatively coupled with the memory, to execute an asymmetric proxy to:
receive a request from a source network, wherein the request identifies each of a plurality of networking layers and header data associated with each of the plurality of networking layers, and wherein the source network sends the request at a networking transport layer of the plurality of networking layers;
determine a destination network associated with the request, wherein the destination network communicates at a networking data link layer of the plurality of networking layers;
remove, from the request, information from the header data associated with each of the plurality of networking layers that identifies the source network;
store in a memory space, the information that is removed from the request;
translate one or more networking layers of the plurality of networking layers of the request to generate a translated request, wherein the translated request comprises information associated with the destination network and information associated with the asymmetric proxy, and wherein the translated request is converted from the networking transport layer supported by the source network to the networking data link layer supported by the destination network; and provide the translated request to the destination network over a tunnel connection between the asymmetric proxy and the destination network, wherein the translated request is provided to the destination network at the networking data link layer.

9. The system of claim 8, wherein to wherein receiving the request, the processing device is further to:

monitor a communication port for communication requests; and detect that the source network initiated a connection using the communication port.

10. The system of claim 8, wherein to determine the destination network, the processing device is further to:

receive one or more networking attributes associated with the destination network; and store the one or more networking attributes associated with the destination network in the memory space.

11. The system of claim 10, wherein to translate the one or more networking layers of the request, the processing device is further to:

determine one or more networking attributes of the information associated with the asymmetric proxy;

replace the information associated with the source network with at least one of the one or more networking attributes associated with the asymmetric proxy in one or more of the plurality of networking layers of the request; and insert at least one of the one or more networking attributes associated with the destination network into the one or more of the plurality of networking layers of the request.

12. The system of claim 8, wherein to provide the request to the destination network, the processing device is further to:

initiate the tunnel connection to the destination network using a tunneling protocol; and send the request to the destination network over the tunnel connection, wherein the request is sent to the destination network at the networking data link layer.

13. The system of claim 8, wherein the processing device is further to:

receive a response from the destination network over the tunnel connection, wherein the destination network sends the response at the networking data link layer;

remove information associated with the destination network from one or more networking layers of the response;

determine the source network associated with the response;

retrieve at least a portion of the information associated with the source network that was removed from the request from the source network from the memory space;

translate the one or more networking layers of the response to include the retrieved information associated with the source network; and send the response to the source network, wherein the response is sent to the source network at the networking transport layer.

14. The system of claim 9, wherein the processing device is further to:

receive a termination request from the source network to terminate the connection to the destination network;

remove information associated with the source network from one or more networking layers of the termination request;

translate the one or more networking layers of the termination request to include information associated with the destination network; and send the termination request to the destination network over the tunnel connection.

15. The system of claim 14, wherein the processing device is further to:

receive an acknowledgement of the termination request from the destination network over the tunnel connection;

terminate the tunnel connection to the destination network; and delete the information associated with the source network from the memory space.

16. A non-transitory computer readable medium comprising instructions, which when accessed by a processing device, cause the processing device to execute an asymmetric proxy to:

receive a request from a source network over a tunnel connection between the source network and the asymmetric proxy, wherein the request identifies each of a plurality of networking layers and header data associated with each of the plurality of networking layers, and wherein the source network sends the request at a networking data link layer of the plurality of networking layers;

remove, from the request, information from the header data associated with each of the plurality of networking layers that identifies the source network;

store, in a memory space, the information that is removed from the request;

determine a destination network associated with the request, wherein the destination network communicates at a networking transport layer of the plurality of networking layers;

translate one or more networking layers of the plurality of networking layers of the request to generate a translated request, wherein the translated request comprises information associated with the destination network and information associated with the asymmetric proxy, and wherein the translated request is converted from the networking data link layer supported by the source network to the networking transport layer supported by the destination network;

initiate a networking connection to the destination network; and send the translated request to the destination network over the networking connection, wherein the request is sent to the destination network at the networking transport layer.

17. The non-transitory computer readable medium of claim 16, wherein the processing device is further to:

receive one or more network configuration settings associated with the source network; and initiate the tunnel connection to the source network using a tunneling protocol in view of the network configuration settings.

18. The non-transitory computer readable medium of claim 16, wherein the processing device is further to:

receive a response from the destination network over the network connection, wherein the destination network sends the response at the networking transport layer;

determine the source network associated with the response;

retrieve the information associated with the source network that was removed from the request from the source network from the memory space;

insert at least a portion of the information associated with the source network into one or more networking layers of the response; and send the response to the source network, wherein the response is sent to the source network at the networking data link layer.

19. The non-transitory computer readable medium of claim 16, wherein the processing device is further to:

receive a termination request from the source network to terminate the connection to the destination network;

send the termination request to the destination network over the network connection;

receive an acknowledgement of the termination request from the destination network over the network connection;

terminate the networking connection to the destination network;

retrieve the information associated with the source network from the memory space;

insert at least a portion of the information associated with the source network into the one or more networking layers of the acknowledgement; and send the acknowledgment to the source network, wherein the acknowledgment is sent to the source network at the networking data link layer.

20. The non-transitory computer readable medium of claim 19, wherein the processing device is further to:

delete the information associated with the source network from the memory space.

21. A method comprising:

receiving, by an asymmetric proxy, a request from a source network over a tunnel connection between the source network and the asymmetric proxy, wherein the request identifies each of a plurality of networking layers and header data associated with each of the plurality of networking layers, and wherein the source network sends the request at a first networking layer, of the plurality of networking layers;

determining a destination network associated with the request, wherein the destination network communicates at a second networking layer of the plurality of networking layers, and wherein the second networking layer is different than the first networking layer;

removing, from the request, information from the header data associated with each of the plurality of networking layers that identifies the source network;

storing, in a memory space, the information that is removed from the request;

converting at least a portion of the request to generate a converted request, wherein the converted request is converted from compatibility with the first networking layer for the source network to compatibility with the second networking layer for the destination network and wherein the converted request comprises information associated with the destination network and information associated with the asymmetric proxy;

initiating a networking connection to the destination network; and sending the converted request to the destination network over the networking connection, wherein the request is sent to the destination network at the second networking layer.

22. The method of claim 21, wherein the first networking layer comprises a networking data link layer and the second networking layer comprises a networking transport layer.

23. The method of claim 21, wherein the at least a portion of the request comprises one or more networking components of the request, wherein each of the one or more networking components corresponds to a respective networking layer of the plurality of networking layers.

24. The method of claim 21, further comprising:

receiving one or more network configuration settings associated with the source network; and initiating the tunnel connection to the source network using a tunneling protocol in view of the network configuration settings.

25. The method of claim 21, further comprising:

receiving a response from the destination network over the network connection, wherein the destination network sends the response at the second networking layer;

determining the source network associated with the response;

retrieving the information associated with the source network from the memory space;

inserting at least a portion of the information associated with the source network into the one or more networking components of the response; and sending the response to the source network, wherein the response is sent to the source network at the first networking layer.

26. The method of claim 21, further comprising:

receiving a termination request from the source network to terminate the connection to the destination network;

sending the termination request to the destination network over the tunnel connection;

receiving an acknowledgement of the termination request from the destination network over the network connection;

terminating the networking connection to the destination network;

retrieving the information associated with the source network that was removed from the request from the source network from the memory space;

inserting at least a portion of the information associated with the source network into the one or more networking components of the acknowledgement; and send the acknowledgment to the source network, wherein the acknowledgment is sent to the source network at the first networking layer.

27. The method of claim 26, further comprising:

deleting the information associated with the source network from the memory space.

28. The method of claim 27, further comprising:

terminating the tunnel connection to the source network.

* * * * *